(12) United States Patent
Yoshikawa et al.

(10) Patent No.: US 8,962,143 B2
(45) Date of Patent: Feb. 24, 2015

(54) PTFE-BASED SLIDING MATERIAL, BEARING, AND METHOD FOR PRODUCING PTFE-BASED SLIDING MATERIAL

(75) Inventors: Masaru Yoshikawa, Aichi (JP); Akira Sawamoto, Aichi (JP); Hiroshi Ueda, Aichi (JP)

(73) Assignee: Taiho Kogyo Co., Ltd., Toyota-Shi (JP)

( * ) Notice: Subject to any disclaimer, the term of this patent is extended or adjusted under 35 U.S.C. 154(b) by 468 days.

(21) Appl. No.: 12/937,722

(22) PCT Filed: Oct. 26, 2009

(86) PCT No.: PCT/JP2009/068355
§ 371 (c)(1),
(2), (4) Date: Jan. 10, 2011

(87) PCT Pub. No.: WO2010/050444
PCT Pub. Date: May 6, 2010

(65) Prior Publication Data
US 2011/0097593 A1   Apr. 28, 2011

(30) Foreign Application Priority Data

Oct. 27, 2008 (JP) ................................ 2008-275834

(51) Int. Cl.
*B32B 5/18* (2006.01)
*B32B 15/04* (2006.01)
*B32B 15/08* (2006.01)
*B32B 15/085* (2006.01)
(Continued)

(52) U.S. Cl.
CPC .............. *F16C 33/201* (2013.01); *B32B 27/02* (2013.01); *B32B 27/04* (2013.01); *F05C 2225/04* (2013.01)

USPC ..... 428/463; 428/626; 428/306.6; 428/307.3; 428/308.4; 428/311.11; 428/323; 428/421; 428/422; 428/457; 428/461; 384/300; 427/180; 427/372.2; 427/384; 427/385.5; 427/388.1

(58) Field of Classification Search
None
See application file for complete search history.

(56) References Cited

U.S. PATENT DOCUMENTS

| 3,674,689 A |   | 7/1972 | Giltrow et al. |   |
|---|---|---|---|---|
| 4,277,118 A | * | 7/1981 | McCloskey | ................... 384/300 |

(Continued)

FOREIGN PATENT DOCUMENTS

| EP | 0 684 283 A2 | 11/1995 |
| EP | 0 713 972 B1 | 5/1996 |

(Continued)

OTHER PUBLICATIONS

Extended European Search Report dated Sep. 4, 2012 issued in European Application No. 09823554.2.

(Continued)

*Primary Examiner* — Vivian Chen
(74) *Attorney, Agent, or Firm* — Birch, Stewart, Kolasch & Birch, LLP

(57) ABSTRACT

A PTFE-based sliding material, wherein the porous sintered layer on the surface of backing metal is impregnated with baked PTFE, with one or both of the solid lubricant and wear-resistant additive together with fibrous PTFE forming an entangled fibrous PTFE structure, is used for a bearing of air-conditioner. Resistance of the bearing for local wear is required. Such wear resistance is to be enhanced. Carbides of an oligomer or polymer containing a hydrophilic group formed during baking are incorporated in the entangled structure of fibrous PTFE.

16 Claims, 1 Drawing Sheet

(51) Int. Cl.
| | | |
|---|---|---|
| B32B 15/14 | (2006.01) | |
| B32B 15/18 | (2006.01) | |
| B32B 15/20 | (2006.01) | |
| B32B 27/02 | (2006.01) | |
| B32B 27/04 | (2006.01) | |
| B32B 27/18 | (2006.01) | |
| B32B 27/20 | (2006.01) | |
| B32B 27/32 | (2006.01) | |
| C08L 27/18 | (2006.01) | |
| C08L 29/04 | (2006.01) | |
| C08L 33/02 | (2006.01) | |
| F16C 33/20 | (2006.01) | |
| C09D 127/18 | (2006.01) | |
| C08K 3/04 | (2006.01) | |
| C08K 3/08 | (2006.01) | |
| C08K 3/14 | (2006.01) | |
| C08K 3/22 | (2006.01) | |
| C08K 3/28 | (2006.01) | |
| C08K 3/30 | (2006.01) | |
| C08K 3/32 | (2006.01) | |

(56) References Cited

U.S. PATENT DOCUMENTS

| | | | | |
|---|---|---|---|---|
| 4,615,854 | A * | 10/1986 | Pratt et al. | 264/127 |
| 4,923,737 | A | 5/1990 | De La Torre | |
| 5,039,575 | A | 8/1991 | Mori et al. | |
| 5,272,186 | A * | 12/1993 | Jones | 523/339 |
| 5,405,923 | A * | 4/1995 | Aten | 526/73 |
| 5,415,791 | A * | 5/1995 | Chou et al. | 508/103 |
| 5,450,184 | A | 9/1995 | Yanai et al. | |
| 5,486,299 | A | 1/1996 | Fuwa et al. | |
| 5,732,322 | A | 3/1998 | Nakamaru et al. | |
| 5,814,698 | A * | 9/1998 | Montagna et al. | 524/544 |
| 5,911,514 | A * | 6/1999 | Davies et al. | 384/300 |
| 6,123,009 | A | 9/2000 | Kanayama et al. | |
| 6,332,716 | B1 | 12/2001 | Kato et al. | |
| 6,548,188 | B1 * | 4/2003 | Yanase et al. | 428/626 |
| 6,752,065 | B2 | 6/2004 | Sugioka et al. | |
| 7,671,123 | B2 * | 3/2010 | Hoshikawa et al. | 524/366 |
| 2006/0062503 | A1 * | 3/2006 | Iwata | 384/300 |
| 2007/0013094 | A1 | 1/2007 | Bischofsberger et al. | |
| 2007/0166546 | A1 * | 7/2007 | Ichikawa et al. | 428/408 |
| 2008/0008838 | A1 | 1/2008 | Arpac et al. | |

FOREIGN PATENT DOCUMENTS

| | | | | |
|---|---|---|---|---|
| EP | 1 132 634 | A2 | | 9/2001 |
| GB | 796 610 | | * | 6/1958 |
| GB | 1006190 | | | 9/1965 |
| GB | 1 319 789 | | * | 6/1973 |
| JP | 60-72952 | | | 4/1985 |
| JP | 1-108413 | A | | 4/1989 |
| JP | 2-2475 | B2 | | 1/1990 |
| JP | 3-119095 | A | | 5/1991 |
| JP | 4-25669 | | | 1/1992 |
| JP | 7-97517 | A | | 4/1995 |
| JP | 8-41484 | A | | 2/1996 |
| JP | 10-219270 | A | | 1/1998 |
| JP | 2007-92916 | | | 8/1998 |
| JP | 10-246231 | A | | 9/1998 |
| JP | 10-338511 | | * | 12/1998 |
| JP | 2000-136397 | A | | 5/2000 |
| JP | 2000-265953 | A | | 9/2000 |
| JP | 2002-5013 | A | | 1/2002 |
| JP | 2002-20568 | A | | 1/2002 |
| JP | 2002-30166 | A | | 1/2002 |
| JP | 2002-039062 | A | | 2/2002 |
| JP | 2002-89437 | A | | 3/2002 |
| JP | 2002-180961 | A | | 6/2002 |
| JP | 2003-183685 | | | 7/2003 |
| JP | 2007-092916 | | * | 12/2007 |
| JP | 2008-69196 | A | | 3/2008 |
| KR | 2003-0038344 | A | | 5/2003 |
| KR | 2003-0063566 | A | | 7/2003 |
| WO | WO 03/010237 | A1 | | 2/2003 |

OTHER PUBLICATIONS

International Search Report for PCT/JP2009/068355, mailed on Jan. 19, 2010.

English translation of Chinese Office Action issued on Jul. 9, 2013 in corresponding Chinese Patent Application No. 200980142466.2.

Jean-Louis Salager; Surfactants Types and Uses; FIRP Booklet #E300-A; Universidad De Los Andes; Version #2 (2002).

* cited by examiner

PTFE-BASED SLIDING MATERIAL, BEARING, AND METHOD FOR PRODUCING PTFE-BASED SLIDING MATERIAL

TECHNICAL FIELD

The present invention relates to a PTFE-based sliding material. The present invention also relates to a bearing, particularly a bearing of compressor for automobile air-conditioners, and to a method for producing PTFE-based sliding material.

BACKGROUND TECHNIQUE

PTFE (polytetrafluoroethylene) is a representative low-friction tribological material having the following characteristics.
(a) Melting Point: According to research publications, the melting point is constant at 327 degrees C. or has a range thereabouts.
(b) Meting Viscosity: Melting viscosity is as high as $10^{11}$ to $10^{12}$ Poise at 327 degrees C. Commercial PTFE dose not virtually flow even at the melting point or higher. Voids are therefore liable to remain after baking.
(c) Crystallinity: PTFE is classified as a crystalline resin and has high molecular weight.
(d) Processing Method: A porous sintered layer is impregnated with a PTFE dispersion consisting of finely divided PTFE particles, surfactant and water, followed by baking. The resultant product is used as a bearing.
(e) Structure: When the pre-baked PTFE is subjected to shear, it is easily fibrillated. The structure is apparently partially non-fibrillated after baking but the fibril structure is recognized when observed at high resolution. Therefore, the PTFE-based sliding material processed as (d) above has a fibril crystalline morphology.

Techniques for enhancing wear resistance of PTFE are largely classified into a method of adding an additive and a method for improving the structure of PTFE for itself. First, techniques for improving the wear resistance by additives are listed.

Patent Document 1: Japanese Unexamined Patent Publication (kokai) No. Hei 1-108413 proposes to impregnate a porous layer of backing metal with aromatic group polyetherketone, PTFE and metal fluoride and apply the aromatic group polyetherketone and the like on the porous layer.

Patent Document 2: Japanese Unexamined Patent Publication (kokai) No. Hei 8-41484 discloses a PTFE-based sliding material with the following additive components A, B and C: component A—phosphate, barium sulfate; component B—magnesium silicate or mica; and, component C—Pb, Sn, Pb—Sn alloy. In one example, a porous layer of a backing steel sheet is impregnated with PTFE and petroleum-based solvent, and the solvent is vaporized at 200 degrees C. Subsequently, pressure application by rolling is carried out. Heating is carried out at 370 degrees C. for 10 minutes, and pressure application by rolling is again carried out.

Pb exhibits excellent solid lubricant properties but its use is limited due to environmental problems. Therefore, Patent Document 3: Japanese Unexamined Patent Publication (kokai) No. 2002-20568 proposes addition of barium sulfate, molybdenum disulfide, graphite or the like to PTFE. In one example provided in this patent document, additives such as barium sulfate and PTFE resin (spherical colloidal hydrophobic resin obtained by emulsion polymerization) are mixed. A porous layer of backing metal is impregnated with the resultant mixture by means of a roll. Baking is carried out at 370 to 420 degrees C.

Next, prior art for improving the structure of a PTFE material are listed. Wear resistance and seizure resistance of the PTFE-based resin are unsatisfactory under such a severe conditions as in a main bearing of a compressor, which is subjected to cantilever load. Patent Document 4: Japanese Unexamined Patent Publication (kokai) No. 2007-09216 proposes a measure against the drawback described above, namely, twice baking to eliminate the boundary layer and to reinforce PTFE.

Patent Document 5; Japanese Unexamined Patent Publication (kokai) No. 2008-69196 belongs to none of the two classifications mentioned hereinabove. The method described in Patent Document 5 features that: PTFE contains a small amount of perfluoro octanic acid as an auxiliary agent of production; PTFE is dispersed by mean of an acrylic-resin-based dispersing agent; a porous layer of backing metal is impregnated with the resultant PTFE dispersion; and baking is carried out at 380 to 430 degrees C. The carboxyl group contained in the acrylic resin-based dispersion agent exerts a detrimental influence on the bearing performance. The time required for completely decomposing the acrylic resin at the baking temperature of PTFE is a few hours to a few tens of hours. As a result, complete decomposition of acrylic resin may not be realized. Therefore, the remaining amount of acrylic resin in the final product is specifically limited to 0.5% or less relative to PTFE.

A porous copper-alloy sintered layer is impregnated with a mixture of fluorine resin and solid lubricant, such as Pb, Zn, barium sulfate, graphite and the like. The mixture is dried and baked to provide a PTFE-based sliding material. This sliding material is frequently used in the production of a main bearing and a thrust bearing of a compressor for automobile air conditioner.

PRIOR ART DOCUMENTS

Patent Documents

Patent Document 1: Japanese Unexamined Patent Publication (kokai) Hei 1-108413
Patent Document 2: Japanese Unexamined Patent Publication (kokai) Hei 8-41484
Patent Document 3: Japanese Unexamined Patent Publication (kokai) 2002-20568
Patent Document 4: Japanese Unexamined Patent Publication (kokai) 2007-92916
Patent Document 5: Japanese Unexamined Patent Publication (kokai) 2008-69196

DISCLOSURE OF INVENTION

Problems to be Solved by Invention

A typical method to ensure wear resistance, which is a property particularly required for a PTFE-based sliding material, is to mix PTFE with a hard resin such as polyetheretherketone or a wear-resistant additive. However, this method is not satisfactory for ensuring a good bearing performance of a compressor for automobile air-conditioner.

An ordinary bearing used in a compressor for automobile air-conditioner is designed to apply a cantilever load to a bearing. A porous copper-alloy sintered layer, which is impregnated with a PTFE-based bearing material, is therefore subjected to a local load. Sliding occurs on the PTFE-based resin layer. The PTFE-based sliding material according to the present invention is used for such bearing mentioned above. PTFE of the PTFE-based resin material is transferred to and deposits on the opposite material. This phenomenon is utilized in the PTFE-based material. Under boundary-lubrication conditions of the compressor, the transferring and deposition effect of PTFE is insignificant. In addition, bonding strength at the interfaces between the PTFE and hard resin or wear-resistant additive is low. Consequently, since wear resistance is not expected, the resin coating on the porous sintered layer must be strengthened to enhance the sliding performance. The twice baking method proposed in Patent Document 4 meets such requirements but incurs a problem of cost increase.

It is an object of the present invention to improve the properties of PTFE-based resin, which is used to produce parts subjected to cantilever load and is thus liable to localized wear. The main bearing of a compressor for automobile air-conditioner has such a structure that it bears cantilever load. Therefore, the worn portions of main bearing disadvantageously provide sites where a friction increase and hence a torque increase start to occur. When such a main bearing is continuously used for a prolonged period, seizure finally occurs. It is therefore a particular object of the present invention to improve properties of a PTFE-based sliding material suitable for the main bearing mentioned above.

Means for Solving the Problems

The present inventors made energetic research on reinforcing material of PTFE and discovered the following. When PTFE is baked while it is isolated from oxygen and the like as perfectly as possible, an organic material such as surfactant is carbonized at the vicinity of baking temperature, while materials other than carbon, such as the oxygen, hydrogen, nitrogen and the like contained in the organic material leave such organic material. The thus-carbonized material and PTFE fibers are entangled with one another. In addition, dispersed carbides are considerably finer than the dispersion of the additive carbide or graphite particles in the baked PTFE. As a result, the PTFE coating is reinforced and hence wear resistance is improved. This result is also attributable to the fact that the oligomer or polymer having a hydrophilic group and used in the present invention is uniformly dispersed the PTFE dispersion. Observation of a test material by a scanning electron microscope led to the discoveries mentioned above. FIG. 1 schematically illustrates the observation result. In the drawing, PTFE fibers 1 are in the form of strings entangled with one another, because the PTFE dispersion underwent a mixing procedure. Any oligomer or polymer having a hydrophilic group is carbonized. The resultant material is hereinafter referred to as "carbide" 2. Specifically, when one looks a relationship of carbide 2 with respect to PTFE 1, 2 is sandwiched by curved portions of 1, or 2 is present in the vicinity of 1. When one looks at relationship of fibrous PTFE with respect to carbide 2, 1 surrounds 2. Viewing as a whole, carbide 2 is incorporated in the entangled PTFE fibers 1.

In the PTFE-based sliding material according to the present invention, a porous sintered layer on the surface of a backing metal is impregnated with PTFE and PTFE is baked. Occasionally the porous sintered layer may also be impregnated with one or both of a solid lubricant and wear-resistant additive. The PTFE-based sliding material according to the present invention is characterized in that oligomer or polymer is carbonized, and the resultant carbon is incorporated in the entangled fibrous PTFE structure.

In a method for producing a PTFE-based sliding material according to the present invention, a PTFE dispersion containing one or more oligomer or polymer having a hydrophilic group is baked. The method is characterized by baking under a non-oxidizing atmosphere so as to carbonize said oligomer or polymer having a hydrophilic group and leaving them as a reinforcing component. The present invention is hereinafter described in detail.

As is described hereinabove, the fundamental components of the PTFE dispersion are PTFE fine particles and an activator (surfactant). In many cases, polymeric solid matter is added. Occasionally, barium sulfate, graphite, iron phosphides and the like are also added. The porous layer on the surface of a backing metal is impregnated with PTFE dispersion and it is usually baked at the vicinity of the melting point of PTFE. During the baking stage, water and the surfactant are vaporized. It turned out as a result of inventors' experiments that, when the baking conditions are controlled, materials other than carbon, such as oxygen, hydrogen and nitrogen, are removed from the polymeric solid material and surfactant, while essentially only carbon is left and the polymeric solid material and surfactant are carbonized. While oxygen, hydrogen and the like are being removed, vaporized components in the form of tar are present on the surface of impregnated PTFE layer. When baking is further continued, the tar-form material is removed, and surfactant and the like are converted essentially to carbon in the entire sintered material. The material formed as above is carbide.

The carbide in the present invention is now described. According to the X-ray diffraction method, its structure is not crystalline, such as graphite, but amorphous. The vaporizing components of oligomer molecules are eliminated and the carbon comes together and forms finely divided particles. Such finely divided particles do not cover the PTFE fibers but are sandwiched in the entangled structure of PTFE particles. The finely divided particles deposit on the fibers or are present in the vicinity of the fibers. That is, since the carbide is incorporated in such an entangled structure, presumably carbide particles render movement of PTFE fibers difficult. Thus, the PTFE fibers are reinforced. In addition, presumably, each of the PTFE fibers and the finely divided carbide particles slide on the counterpart material.

A nonionic surfactant having a hydrophilic group is preferably used in the present invention as an oligomer source. Specifically, the oligomer may be a fatty acid group, such as polyoxyethylene fatty acid ester, polyoxyethylene sorbitan fatty acid ester, sorbitan fatty acid ester, and sucrose fatty acid ester; a higher alcohol group, such as polyoxyethylene alkyl ether, and alkyl glycoside; or an alkyl phenol group, such as polyoxyethylene alkylphenyl ether. More preferably, the surfactant is higher alcohol group or alkyl phenol group. In addition, alkyl amine oxide can be used in the present invention as an ampholytic surface active agent.

Preferably, polyvinyl alcohol or polyacrylic acid can be used for the polymer in the present invention. Preferable characteristics for these oligomers and polymers are that they are soluble in water contained in the PTFE dispersion and do not impede the dispersion stability.

The surfactant contained in a commercial polymer dispersion may be carbonized, and the resultant carbonized surfactant is effective. However, the surfactant may be additionally added to the commercial polymer dispersion. In the latter case, baking and carbonizing are simultaneously carried out for an ordinary sintering time. When the amount of the added surfactant is large, the amount of carbide is preferably increased so as to reinforce the coating. However, when hydrophilic organic matter is excessively added, viscosity of PTFE increases to impair its impregnation into the porous sintered layer. Therefore, the addition amount of the hydrophilic organic matter should be regulated.

The materials other than those mentioned hereinabove, such as those of a backing metal and a porous sintered layer, and the thickness of an impregnation layer are known. Related descriptions in Patent Document 4 (Paragraph 0007) may be optionally employed.

The PTFE-based sliding material according to the present invention may further contain either or both of at least one solid lubricant preferably selected from the group consisting of $MoS_2$, graphite, $BaSO_4$, Zn and Pb, and an at least one wear-resistant additive preferably selected from the group consisting of $Al_2O_3$, BN, iron-based phosphides, $SiO_2$ and aromatic group polyester. Preferably, the backing metal is a steel sheet, and the porous sintered layer is copper alloy.

In addition, the PTFE-based sintered layer according to the present invention can be preferably used for producing a main bearing of an automobile or household compressor.

The PTFE-based sliding material according to the present invention can prevent local wear due to cantilever load. Probably, this is attributable to (a) dispersion uniformity, (b) morphology of finely divided particles, (c) dispersion in the entangled structure, and (d) reinforcement by carbide. Specifically, since a liquid surfactant is uniformly dispersed in the dispersion, the fine dispersion state is maintained even after impregnation. Most part of the liquid surfactant vaporizes and the remaining material is carbonized to form carbides. The carbide dispersed in the entangled structure of PTFE fibers hinders movement of the fibers when the sliding material is subjected to sliding. The carbide reinforces the sliding material as a whole. Even in a situation that transfer and deposition of PTFE is not expected, wear resistance is satisfactorily exhibited.

Although barium sulfate and graphite have properties to enhance the wear resistance, since these materials in powder form are added to and mixed with PTFE, their dispersion function of PTFE does not result from Items (a) through (d) mentioned hereinabove. That is, every one of (a)-(d) is deficient in the case of adding barium sulfate and graphite.

In a case where aromatic group polyester powder having an average particle size of approximately 15 μm is thoroughly mixed with PTFE, none of the above mentioned (b), (c) and (d) are realized. In contrast, since the carbide according to the present invention and PTFE fibers are entangled, the carbide not only impedes direct contact of PTFE with the opposite material, but also renders movement of PTFE fibers difficult. The present invention is hereinafter described in detail with reference to the examples.

BEST MODE FOR CARRYING OUT THE INVENTION

Examples

A 0.3 mm-thick sintered phosphorus bronze layer was formed on a backing metal made of a 0.85 mm-thick low carbon-steel sheet (S15C). The following components were used to produce a sliding material.

PTFE (Product of Daikin Kogyo Co., Ltd., product name—Polyfron Dispersion D1E. 3 parts of a nonionic surfactant (Product of Nichiyu Kagaku, Nonion HS-204.5) was blended with 100 parts of D1E. In the PTFE dispersion, water did not separate from the other components of PTFE. In Comparative Example 1, the nonionic surfactant mentioned above was not added, and the baking atmosphere was air. Therefore, carbide reinforcing was not performed.

$MoS_2$: average particle diameter-1.0 μm (Product of Sumiko Junkatsu Co., Ltd.: name of goods-PA powder)

Graphite: average particle diameter-1.0 μm (Product of Nihon Kokuen Co., Ltd.: Name of goods-CSSP)

$BaSO_4$: average particle diameter-10 μm (Product of Sakai Kagaku Co., Ltd.: Name of goods-BMH-100)

$Al_2O_3$: average particle diameter-0.5 μm (Product of Wako-Junyaku Co., Ltd.: Name of goods-M60G-B)

BN: average particle diameter 1 μm (Product of Denki Kagaku Co., Ltd.: Name of goods-SP-1)

The components of the sliding material mentioned above were blended and mixed to provide the compositions shown in Table 1. The mixture was gently stirred so as not to cause coagulation. The porous layer of the sintered copper-alloy layer formed on a backing metal was impregnated with the resultant paste of fibrilized PTFE, which was then dried at approximately 100 degrees C. With regard to the inventive examples, baking was carried out at 380 degrees C. for 5 minutes in a nitrogen-gas atmosphere. Samples of the examples were subjected to microscopic observation. The results are shown in FIG. 1. That is, carbide was incorporated in the entangled fibrous PTFE structure. Meanwhile, in the comparative examples only the entangled PTFE structure was observed. Thus, it turned out that the surfactant originally added to a PTFE dispersion was totally decomposed and vaporized.

Next, a sheet-form sample 3 and a cylindrical counterpart material 4 were arranged as shown in FIG. 2, and the amount of wear was measured. The testing conditions are as follows.

Speed—0.3 m/s
Load—5 MPa
Test time—3 hours
Temperature—room temperature
Apposite material—JIS SCM415
Lubrication—none The test results are shown in Table 1.

| | PTFE (Coating) | | | | | | | Wear Resistant Additive | | | | | Wear |
| | Carbide Reinforcing (yes) | Carbide Reinforcing (no) | Solid Lubricant | | | | | Aromatic Polyester | $Al_2O_3$ | BN | Iron-Phosphide | $SiO_2$ | Amount μm |
| | | | $MoS_2$ | Graphite | $BaSO_4$ | Zn | Pb | | | | | | |
| --- | --- | --- | --- | --- | --- | --- | --- | --- | --- | --- | --- | --- | --- |
| Comparative Example 1 | — | 100 | — | — | — | — | — | — | — | — | — | — | 80 |
| Example 1 | 100 | — | — | — | — | — | — | — | — | — | — | — | 60 |
| Example 2 | Bal | — | 10 | 8 | 4 | — | — | — | — | — | — | — | 13 |
| Example 3 | Bal | — | 8 | 8 | 4 | — | — | 3 | — | — | — | — | 10 |
| Example 4 | Bal | — | 8 | 8 | 4 | — | — | — | 3 | — | — | — | 10 |
| Example 5 | Bal | — | 8 | 8 | 4 | — | — | — | — | 3 | — | — | 11 |
| Example 6 | Bal | — | 8 | 8 | 4 | — | — | — | — | — | 3 | — | 11 |

-continued

| | PTFE (Coating) | | Solid Lubricant | | | | | Wear Resistant Additive | | | | | Wear Amount |
| | Carbide Reinforcing (yes) | Carbide Reinforcing (no) | MoS$_2$ | Graphite | BaSO$_4$ | Zn | Pb | Aromatic Polyester | Al$_2$O$_3$ | BN | Iron-Phosphide | SiO$_2$ | μm |
|---|---|---|---|---|---|---|---|---|---|---|---|---|---|
| Example 7 | Bal | — | 8 | 8 | 4 | — | — | — | — | — | — | 3 | 12 |
| Example 8 | Bal | — | — | — | — | 15 | — | — | 3 | — | — | — | 15 |
| Example 9 | Bal | — | 3 | — | — | — | 20 | — | — | — | — | — | 13 |

It is apparent that the inventive examples are superior to the comparative example in terms of wear resistance.

INDUSTRIAL APPLICABILITY

As is described hereinabove, the PTFE-based sliding material according to the present invention is appropriate particularly for producing a bearing of a car air-conditioner, which is subject to a cantilever load.

DESCRIPTION OF REFERENCE NUMERALS

Figure 1:
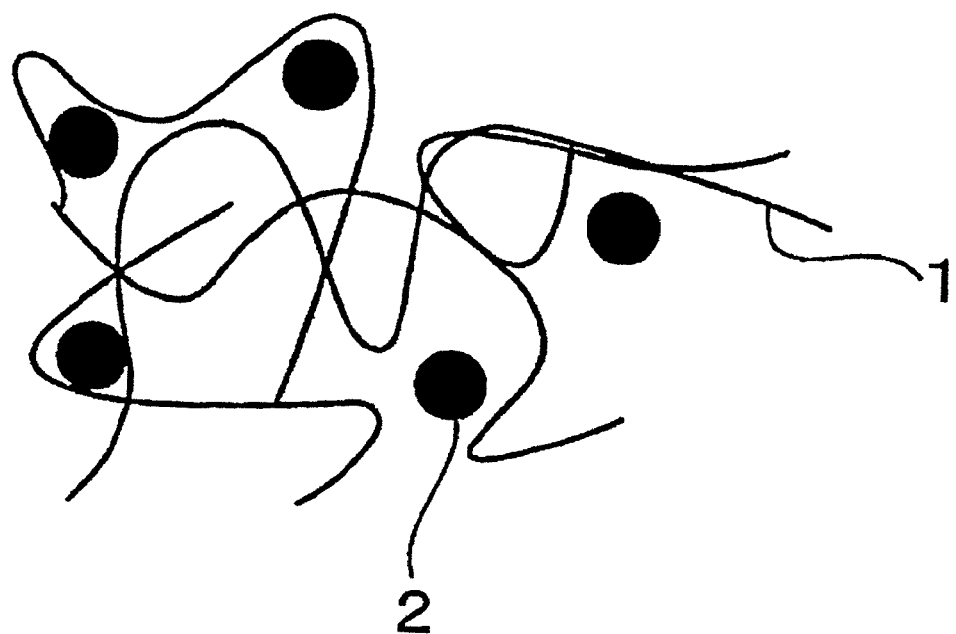
FIG. 1 A schematic drawing showing the structure of the PTFE-based sliding material according to the present invention.
Figure 2:
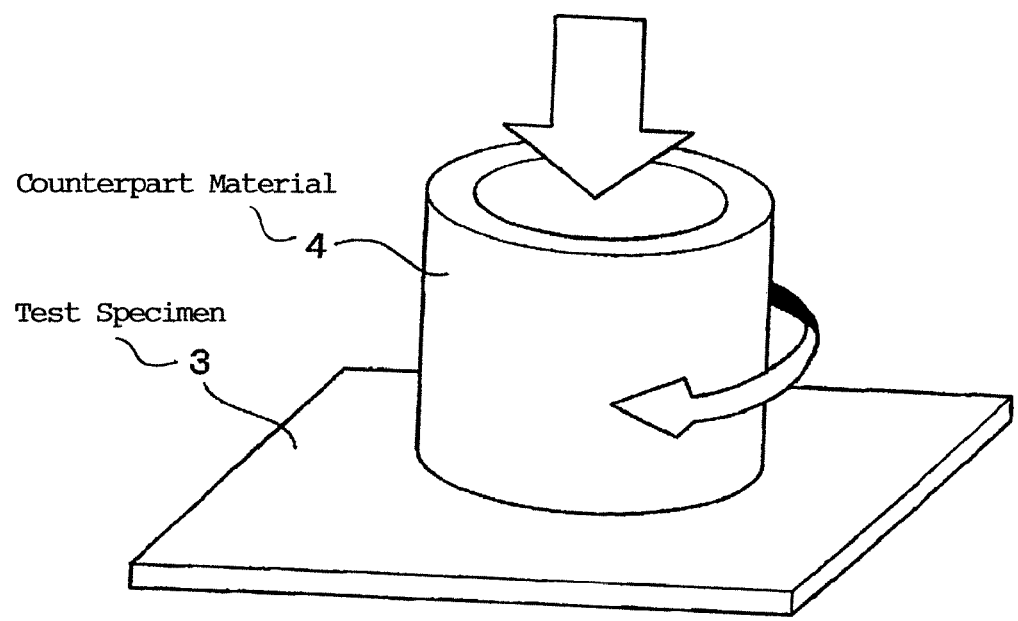
FIG. 2 A drawing showing an essential part of a wear tester.

1 fibrous PTFE
2 carbide
3 test specimen
4 counterpart material

The invention claimed is:

1. A PTFE-based sliding material comprising:
   a backing metal; and
   a porous sintered layer formed on a surface of the backing metal, wherein said porous sintered layer is impregnated with a baked PTFE material;
   said baked PTFE material comprising an entangled PTFE fibers structure and a carbide incorporated therein,
      said entangled PTFE fibers structure formed by dispersing PTFE fibers in a media comprising water and an oligomer or polymer having a hydrophilic group, with the use of a surfactant, and
         wherein said carbide, formed during in situ baking of said oligomer or polymer having a hydrophilic group, being incorporated in the entangled PTFE fibers structure.

2. The PTFE-based sliding material according to claim 1, wherein the PTFE-based sliding material further comprises at least one member selected from the group consisting of a solid lubricant and a wear-resistant additive.

3. The PTFE-based sliding material according to claim 2, wherein the PTFE-based sliding material comprises a solid lubricant, and wherein said solid lubricant is selected from the group consisting of MoS$_2$, graphite, BaSO$_4$, Zn and Pb.

4. The PTFE-based sliding material according to claim 2, wherein the PTFE-based sliding material comprises a wear-resistant additive, and wherein said wear-resistant additive is selected from the group consisting of Al$_2$O$_3$, BN, iron-based phosphide, SiO$_2$ and aromatic polyester.

5. The PTFE-based sliding material according to any one of claims 1 to 4, wherein said polymer having a hydrophilic group is polyvinyl alcohol or polyacrylic acid.

6. The PTFE-based sliding material according to claim 5, wherein the backing metal is a steel sheet, and wherein said porous sintered layer is a copper alloy.

7. A sliding bearing of an automobile or household compressor comprising the PTFE-based sliding material according to claim 6.

8. A sliding bearing of an automobile or household compressor comprising the PTFE-based sliding material according to claim 5.

9. The PTFE-based sliding material according to any one of claims 1 to 4, wherein said oligomer is a nonionic surfactant.

10. The PTFE-based sliding material according to claim 9, wherein the backing metal is a steel sheet, and wherein said porous sintered layer is a copper alloy.

11. A sliding bearing of an automobile or household compressor comprising the PTFE-based sliding material according to claim 10.

12. A sliding bearing of an automobile or household compressor comprising the PTFE-based sliding material according to claim 9.

13. The PTFE-based sliding material according to any one of claims 1 to 4, wherein the backing metal is a steel sheet, and wherein said porous sintered layer is a copper alloy.

14. A sliding bearing of an automobile or household compressor comprising the PTFE-based sliding material according to claim 13.

15. A sliding bearing of an automobile or household compressor comprising the PTFE-based sliding material according to any one of claims 1 to 4.

16. A method for producing a PTFE-based sliding material comprising baking a PTFE dispersion containing at least one of an oligomer or a polymer having a hydrophilic group, wherein the step of baking the PTFE dispersion is performed in a non-oxidizing atmosphere so as to carbonize said oligomer or polymer having a hydrophilic group and thereby form a reinforcing component.

* * * * *